G. H. CLARKE.
Bee Hive.

No. 23,078. Patented March 1, 1859.

WITNESSES
Solomon G. Jones
Friend F. Fisk

INVENTOR
George H. Clarke

UNITED STATES PATENT OFFICE.

GEORGE H. CLARKE, OF EAST WASHINGTON, NEW HAMPSHIRE.

BEEHIVE.

Specification of Letters Patent No. 23,078, dated March 1, 1859.

*To all whom it may concern:*

Be it known that I, GEO. H. CLARKE, of East Washington, in the county of Sullivan and State of New Hampshire, have invented certain new and useful Improvements in Beehives; and I do hereby declare that the following is a full and exact description thereof, reference being had to the accompanying drawings and to the letters of reference marked thereon.

The nature of my invention consists, in the application of peculiar shaped bars, the leading object of which is to cause the bees to build straight and parallel combs;—another effect of these bars is to separate the main hive and brood comb from the surplus honey and boxes. And to enable others skilled in the mechanic arts, to make and use my invention I will proceed to describe its construction and operation.

Figure 1:
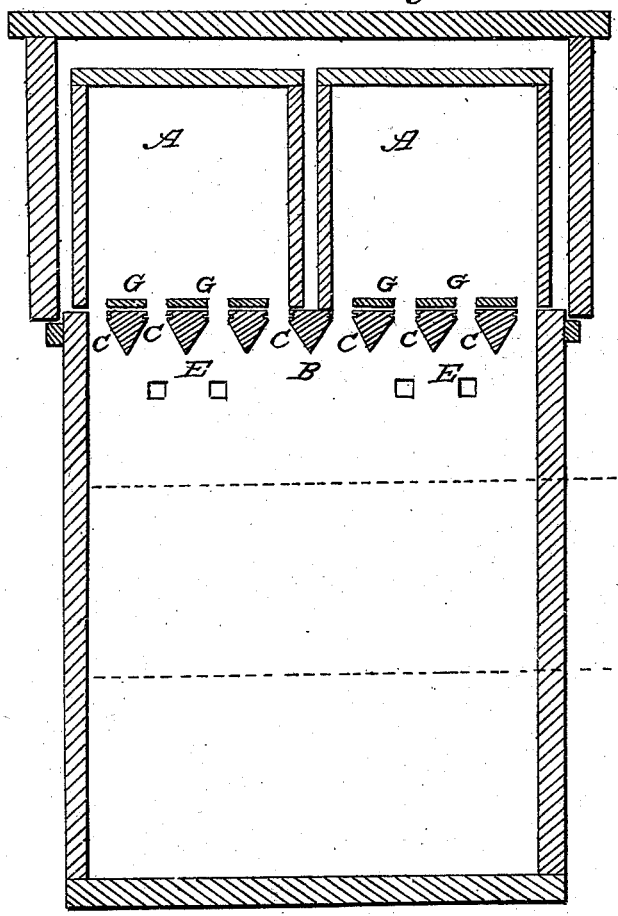
Figure 2:
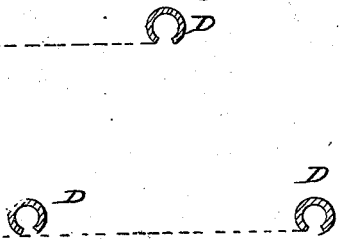
Figure 3:
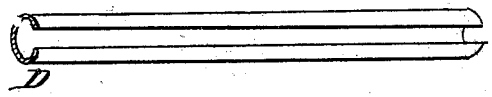
Figure 4:
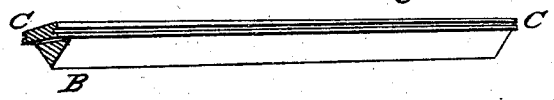

Figure 1, of the annexed drawings is an elevated section, the front being removed, and Fig. 2, is an end view of the hollow bars, their lateral position being represented by the dotted lines. Fig. 3, is a perspective view of a hollow bar, and Fig. 4, is a perspective view of a bar, so constructed as to guide the bees in building their combs straight and parallel to each other. I make my hives in two sections, the lower section containing the bees with their brood combs, and winter store of honey, the upper section containing the boxes marked A, Fig. 1, for receiving the surplus honey.

The top of the lower section is composed of bars of a peculiar form, so made as to form a sharp edge at the middle of the lower surface of the bar, as seen at B, Fig. 1, and Fig. 4. These bars extend across the hive from front to rear, and are one inch wide on the top and seven eighths of an inch deep. The perpendicular sides of the bars are ¼ of an inch wide, the remainder of the depth being beveled as shown at B, Fig. 1 thus forming a sharp edge, where the bees first commence to build their combs. These bars are so placed as to leave spaces between them, and between them and the sides of the hive of about 7/16 of an inch, and a shallow saw kerf in made in the center of the perpendicular sides of the bars as seen at $c, c, c$, Figs. 1, and 4. This saw kerf supplies the bees with an excellent means of suspending themselves by the little hooks on their feet, thus supporting the mass of bees while they are commencing to build their combs.

Apiarists who have understood the great advantages of having the hive well filled with brood comb, have tried, by various methods, to make the bees fill the hive with brood comb, so as to produce the greatest possible increase of bees. Bars of different forms have been adopted, but no certainty or uniformity has been attained by these efforts; the bees in a vast majority of cases building their combs as they pleased, or as they would on the under surface of any board, irrespective of the directions thus given them, and many bee-keepers after a series of such unsuccessful experiments have abandoned the idea, thinking it impossible to devise any kind of bar that will be a sure guide in all cases. Others have constructed bars which joined to a certain course of management which must be perfectly understood by the manager, have caused the bees to build straight and parallel combs. Those experimentalists say themselves that persons unacquainted with their peculiar process would not be able to prevent the bees from working on the top of the hive between the bars, and thus upset all their designs; and if they put on no top or cover the bees will ascend into the cap to work first which also destroys the end they have in view. Some additional guide then was wanting aside from the construction of their bars and frames, which prevents the bees from filling the boxes at the same time they do the lower section of the hive, however large the swarm may be, and however much the room might be needed contained in the boxes; but the bars that I have devised as shown at B, Figs. 1, and 4, is a sure guide for causing the bees to build straight and parallel combs, and any person who may put a swarm of bees in my hive, though ignorant in regard to all designs in its construction, will enjoy the same beneficial results arising from straight and properly constructed combs, that any one could, ever so well instructed upon this point, and if the bees are let into the boxes or cap when first hived, whenever they commence in the lower section they will build their combs with the same order and precision, they would, had they been confined to this apartment when first hived, I prefer however to keep the bees in the lower section twenty-four hours, or until they have built some comb in it, simply for this reason, to prevent the queen from ascending into the boxes to lay her eggs; for the young brood stain the comb to a dark brown color, unfitting it for the market. When the bees are hived they quickly ascend the walls of the hive to the bars and cluster along on them from one end to the other. They here find the most abundant facilities for clustering by hitching the little hooks on their feet into the saw kerf on the sides of the bars as seen at C, C, C, Figs. 1, and 4, and as this is the only suitable support given them from which they can suspend themselves, they, with that precision and order always characteristic in their instinct, lay hold of this support and commence their work in good earnest. As the spaces between the bars are only 7/16 of an inch wide, and the bees being supported from between the bars, there is no other convenient place for them to work upon than the sharp edge at the lower center of the bars as seen at B, Fig. 1. The bees assume the same position on each bar and simultaneously carry down the different combs to the bottom of the hive. By this arrangement the whole swarm having a chance to work to the best possible advantage, a hive of ordinary dimensions can be filled in one half the time it would take without these appliances; and thus it is why the bees have a chance to fill the boxes much sooner than in any other hive.

In latitude north of the city of New York, bees usually swarm in June; at the very time when honey is found in the greatest abundance, and in this latitude the honey harvest does not usually exceed four weeks, and oftener not more than three weeks; and when bees are placed in hives of ordinary dimensions without a guide for building their comb, the bees in their eagerness to lay up as large a store of honey as possible ere the harvest is past, often build very thick ranges of comb, two inches in thickness, this is double the thickness of their brood comb, and can never be used for the purpose of rearing young bees, and being limited to smaller dimensions in a hive than they usually are in their natural home, the hollow tree, and having filled their hive to such an extent with thick or store combs, as not to contain a sufficient quantity of brood comb, the foundation for prosperity and profit is ruined for all succeeding years. Thus it is that thousands of swarms in this country do not afford their keepers one half the profit they would if their combs were all properly constructed as they are in my hive upon the bars that I have devised. But in the hollow tree it is different with bees, from what it is in a hive. Generally they have an abundance of room and if they build a great quantity of thick or store comb and not a sufficient quantity of brood comb the first year, they can build as much as is necessary the next year; but in filling the hive full the first year, if it is not filled as it should be, there is no remedy in after years for this wrong construction of comb. Hence the importance of bars so constructed as to guide the bees in building their combs properly, in regard to the greatest prosperity to the bees, and consequently the greatest amount of profit to the keeper.

The bees in my hive have superior advantages for gaining access to the surplus honey boxes over ordinary hives, the combs all being straight and parallel to each other, and suspended from the lower surface of the bars. Every particle of room around and between the combs is open and free for a passage into the boxes, so when the bees enter the hive it takes them but a moment to ascend into the boxes let them creep up where they will. Whereas in hives having only a few auger holes, or small slots, for opening communication between the main hive or chamber and the smaller chambers or honey boxes,—and nothing to guide the bees in building their combs, they often build across these apertures and nearly obstruct a passage through them, and if they are not thus obstructed, the bees are apt to wander about among the combs a long time in order to find apertures for admittance into the boxes, and in such defective hives the bees will store their honey in the main apartment as long as they can find a place to put it: in this way they often infringe upon the rights of the queen by filling an already insufficient quantity of brood combs with honey so as to prevent her from depositing one-half of her eggs in the comb, thus preventing the necessary increase of bees to keep the swarm in good order.

My hive is ventilated in summer through small apertures near the top of the subsection as seen at E, E, Fig. 1. In winter I ventilate my hive by making two apertures in opposite sides of the upper sections to be opened and closed at pleasure by corresponding buttons. I then remove the surplus honey receptacles from this section and let the impure vapor generated in the hive by the bees pass off through these apertures. I put glass in the ends of the honey boxes and in the back side of the hive for the purpose of witnessing the operations of the bees. Difficulties which I have pointed out in ordinary hives, I obviate by the devices I have described.

Having thus described my invention, I do not now claim the hollow bars, D, for the same was secured to me by Letters Patent the 8th. of January 1856, but,

What I claim as herein particularly described and desire to secure by Letters Patent is—

1. The construction and arrangement of the bars B, B, B, the same consisting in making each of them with a salient angular or sharp or nearly sharp lower edge or surface extending lengthwise of it and downward from it substantially as described and represented, the several bars being arranged at convenient distances for the bees to pass between them or upward into the chambers A, A, as described.

2. I also claim combining with each of the angular bars or constructing the same with one or more saw slots or grooves, C, C, arranged therein substantially in manner and for the purpose as specified.

GEORGE H. CLARKE.

Witnesses:
SOLOMON E. JONES,
FRIEND F. FISK.